(12) United States Patent
Lichtberger

(10) Patent No.: US 12,287,413 B2
(45) Date of Patent: Apr. 29, 2025

(54) METHOD FOR GAUGING A TRACK POSITION

(71) Applicant: HP3 Real GmbH, Vienna (AT)

(72) Inventor: Bernhard Lichtberger, Vienna (AT)

( * ) Notice: Subject to any disclaimer, the term of this patent is extended or adjusted under 35 U.S.C. 154(b) by 379 days.

(21) Appl. No.: 18/009,516

(22) PCT Filed: Apr. 19, 2021

(86) PCT No.: PCT/AT2021/060129
§ 371 (c)(1),
(2) Date: Dec. 9, 2022

(87) PCT Pub. No.: WO2021/253062
PCT Pub. Date: Dec. 23, 2021

(65) Prior Publication Data
US 2023/0221448 A1 Jul. 13, 2023

(30) Foreign Application Priority Data

Jun. 18, 2020 (AT) ................................ A50520/2020

(51) Int. Cl.
| | | |
|---|---|---|
| *G01S 19/43* | (2010.01) | |
| *B61K 9/08* | (2006.01) | |
| *B61L 23/04* | (2006.01) | |
| *E01B 35/00* | (2006.01) | |
| *G01S 19/45* | (2010.01) | |
| *G01S 19/49* | (2010.01) | |

(52) U.S. Cl.
CPC .............. *G01S 19/43* (2013.01); *B61K 9/08* (2013.01); *B61L 23/047* (2013.01); *E01B 35/00* (2013.01);
(Continued)

(58) Field of Classification Search
CPC .......... G01S 19/43; G01S 19/45; G01S 19/49; G01S 2205/04; B61K 9/08; B61K 23/047; B61K 2205/04; E01B 35/00
See application file for complete search history.

(56) References Cited

U.S. PATENT DOCUMENTS

| | | |
|---|---|---|
| 4,812,991 A | 3/1989 | Hatch |
| 7,050,926 B2 | 5/2006 | Theurer et al. |
(Continued)

FOREIGN PATENT DOCUMENTS

| | | | |
|---|---|---|---|
| AU | 2018200145 A1 | | 8/2018 |
| CN | 117048668 A | * | 11/2023 |
(Continued)

OTHER PUBLICATIONS

B. Lichtberger, "Stand der Langsehnenvermessung mittels EM-SAT oder GPS", Der Eisenbahningenieur 46 (1995) 8, pp. 560-563, May 19, 1995.
(Continued)

*Primary Examiner* — Jessica L Laux
*Assistant Examiner* — Clayton Paul Ridder
(74) *Attorney, Agent, or Firm* — Tiajoloff & Kelly LLP

(57) ABSTRACT

A method for gauging a track position uses a track gauging trolley (7) moved on the track. A gauging run is carried out with the track gauging trolley (7), a GPS antenna (8) and an RTK GPS receiver (11) that communicates with an RTK correction data service (RTK-KD), wherein at least one wheel (10) of the track gauging trolley (7) is pressed against a rail (4). Using boundary conditions such as constraint positions, constraint points and maximum permissible track position corrections, to avoid the disadvantages of the drifts of an inertial gauging system during long gauging runs and the only relative information on the track position, the position of the GPS antenna (8) with respect to a reference axis of the track (4, 10) is determined with the aid of a compensation scanner (6) and a computing unit (13), and the measured GPS coordinates are converted into Cartesian coordinates (Pi(xi, yi, zi)) recorded with the computing unit (13) as a spatial curve (3), from which the location image (1), from which a desired curvature image (ksoll) is calcu-
(Continued)

Figure 1:
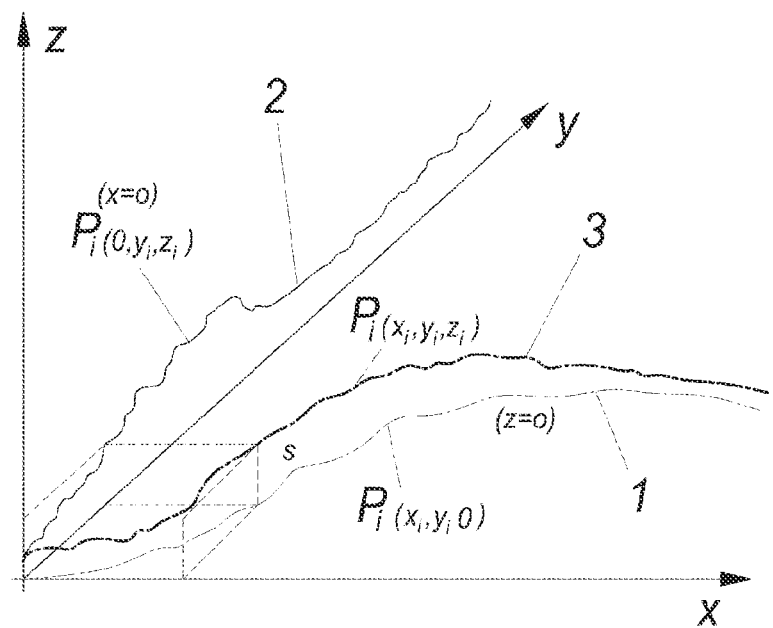

lated, and the longitudinal image (2), from which a desired longitudinal inclination image (Nsoll) is calculated, are formed. An inertial system (INS) is set up on the gauging trolley (7), with which inertial system a correction spatial curve of the same section is created, and recorded using the computing unit (13) and is used as a correction value for the GPS coordinates converted into Cartesian coordinates (Pi (xi, yi, zi)).

12 Claims, 5 Drawing Sheets

(52) U.S. Cl.
CPC .............. G01S 19/45 (2013.01); G01S 19/49 (2013.01); B61L 2205/04 (2013.01)

(56) References Cited

U.S. PATENT DOCUMENTS

| | | | |
|---|---|---|---|
| 8,834,062 B1 * | 9/2014 | Schmidt | E01F 15/006 404/85 |
| 10,174,461 B2 | 1/2019 | Lichtberger | |
| 10,619,313 B2 | 4/2020 | Fruehwirt | |
| 2003/0097235 A1 | 5/2003 | Theurer et al. | |
| 2012/0086598 A1 | 4/2012 | Aghili | |
| 2014/0297069 A1 | 10/2014 | Landes et al. | |
| 2017/0268180 A1 | 9/2017 | Lichtberger | |
| 2018/0106000 A1 | 4/2018 | Fruehwirt | |

FOREIGN PATENT DOCUMENTS

| | | |
|---|---|---|
| DE | 10337976 B4 | 4/2004 |
| EP | 1028325 A2 | 8/2000 |
| EP | 3358079 A1 | 8/2018 |
| WO | 2004/029825 A1 | 4/2004 |
| WO | 2016/090401 A1 | 6/2016 |
| WO | 2016/202420 A1 | 12/2016 |

OTHER PUBLICATIONS

L. Marx, "Satellitengestutzte Gleisvermessung auch beim Oberbau", Der Eisenbahningenieur 58 (2007) 6, pp. 9-13, Jun. 2007.

* cited by examiner

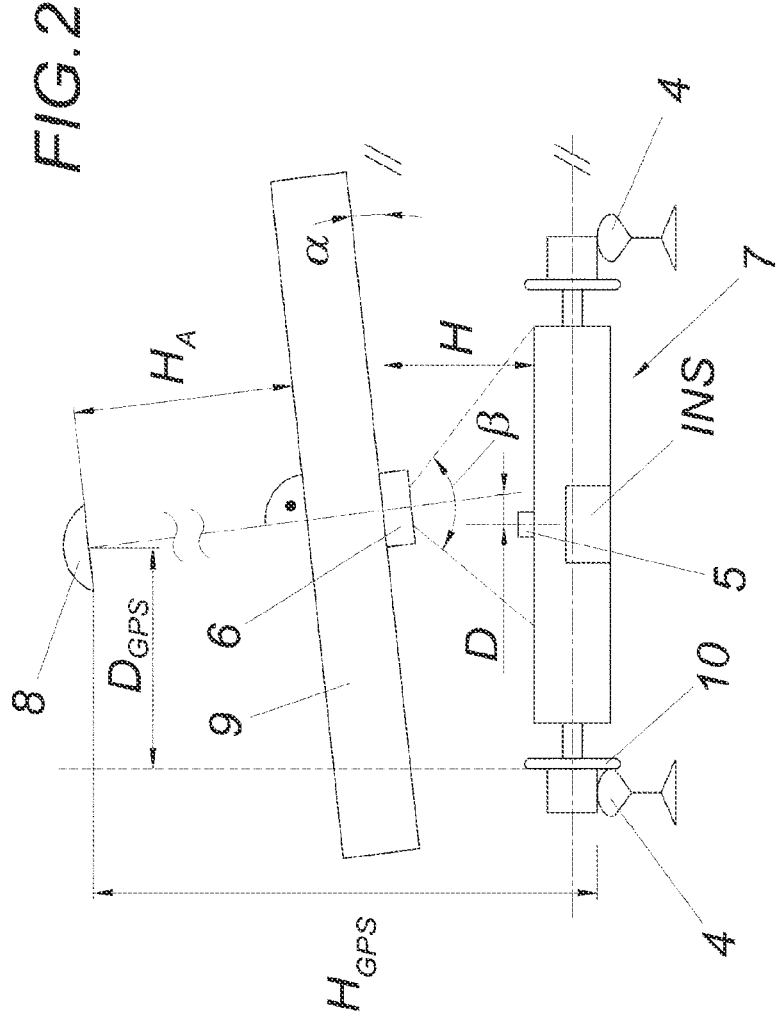

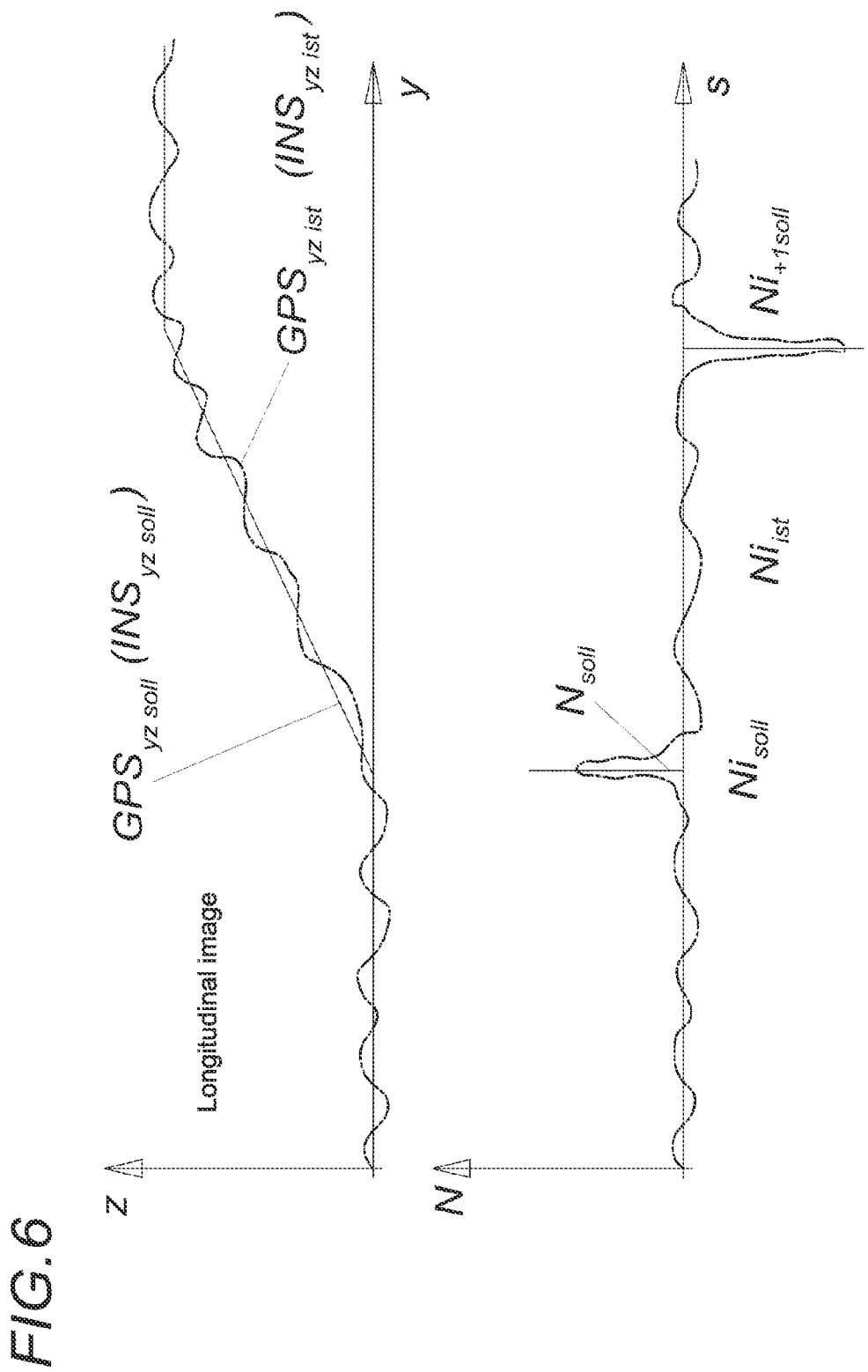

METHOD FOR GAUGING A TRACK POSITION

FIELD OF THE INVENTION

The invention relates to methods for measuring a track position with a track gauging trolley, wherein a gauging run is carried out with the track gauging trolley of a GPS antenna and an RTK-GPS receiver communicating with an RTK correction data service, wherein at least one wheel of the track gauging trolley is pressed against a rail.

DETAILED DESCRIPTION OF THE PRIOR ART

Most railroad tracks are designed as ballasted superstructures. The wheel forces of the trains running over them cause irregular settlements in the ballast and shifts in the lateral position geometry of the track. Due to the settlements of the ballast bed, errors in height, superelevation (in curves) and direction occur. If certain comfort limit values or safety limit values of these geometric quantities are exceeded, then maintenance work becomes necessary.

Correction and rectification of geometric track errors is carried out using track-laying machines. Acceptance and release tolerances are specified for the quality of the track position after improvement by track construction machines or other methods. These represent the requirements of the quality of the geometric improvements produced.

The important quantities to be corrected and recorded are the twist, the longitudinal height of the track, the direction or lateral position of the track, and the cross slope or superelevation of the track.

For today's main lines, the tracks are demarcated absolutely. For this purpose, fixed points are attached to masts and the nominal spacing and nominal height of the track are defined. Between these support points defined in this way, a straight line is defined in the track axis (long chord) and the nominal position of the track is defined between the masts at intervals of approx. 5 m with respect to the height and lateral distance of the track axis (nominal arrow heights, nominal longitudinal heights). The nominal curvature pattern, the nominal changes in inclination and the nominal superelevation of the track, as well as the fixed point data at the masts (track spacing, track height) are usually prepared by the railroad and made available to the maintenance company carrying out the work. For example, the actual position of the track must be measured before the track system is reworked and corrected using a track tamping machine. For this purpose, the actual distance and the actual height of the track to the fixed points is determined for the masts by means of special measuring equipment (fixed point measuring devices, total stations, etc.). From this, the deviation in position and height of the masts is determined by calculating the difference between the nominal and actual data. In addition, the deviations of the nominal to the actual track position based on the long chord must be determined every 5 m. For this purpose, there are various measuring methods such as the EMSat (a two-part machine—the main machine carries a laser receiver and a fixed point measuring unit, the leading machine unit carries the laser). The EMSat uses a laser long chord for long-chord surveying and a fixed point measuring device to determine the deviations on the masts.

From EP1028325 a method is known which uses an EMSat with a GPS measuring device. A GPS receiver is used to determine the relative position of the stationary track measurement vehicle (which carries the laser for the long-chord surveying) in relation to a fixed GPS reference station known in a terrestrial coordinate system and adjacent to the track section to be measured.

U.S. Pat. No. 4,812,991 describes a method and device for rapidly and accurately determining the coordinate position of a movable receiver relative to a fixedly installed receiver.

Further details on the above-mentioned methods are also described in an article "Status of long-chord surveying by means of EM-SAT or GPS" in the technical journal "Der Eisenbahningenieur" 46 (1995) 8, pages 560 to 563.

Deutsche Bahn has approx. 1.2 million fixed points, most of which are attached to masts. The German railroads have set up GPS reference points along their routes (DBRef system basic distance approx. 4 km). By using GPS reference points and a corresponding procedure, these 1.2 million fixed points can be replaced by approx. 7,000 measured GPS reference points. It is a big effort to maintain 1.2 million fixed points, also the measurement of the actual differences of the track position to these fixed points is complex and expensive. More detailed information can be found in the article "Satellite-based track surveying also for permanent way" in the technical journal "Der Eisenbahningenieur" 58 (2007) 6, pages 9 to 13.

The accuracy of "normal" GPS measurements is in the order of meters. With so-called differential GPS, the accuracy can be increased in the sub-meter range. This is still too inaccurate for track geometry applications. Known are virtual GPS correction data services that send Real Time Kinematic (RTK) correction data to suitable GPS receivers. This requires only one moving GPS-based measurement vehicle moving on the track. RTK GPS has the advantage of being able to determine the absolute location very precisely (about 5 mm in position and 10-15 mm in height) using RTK correction data. The more satellites and satellite systems are received simultaneously by a GPS receiver, the more accurate the results. Modern satellite receivers simultaneously receive and utilize the GPS, GLONASS, GALILEO, BeiDou, QZSS, IRNSS and SBAS satellite systems. They can send data to the correction service and receive correction data on a second channel. The accuracy in the range of 5-15 mm is too inaccurate for the calculation of correction values for a track tamping machine for uplift or direction, but it is sufficient to define absolute reference points of the track geometry.

Various track alignment methods have been developed for correcting track faults. There are relative methods that only smooth the track position and absolute methods. In the case of absolute methods, the track positions are corrected according to predefined marketed nominal geometries. The nominal geometries of the railroad tracks are available as track position plans and can be used after input into the control computer of the superstructure machine for the calculation of the systematic errors under knowledge of the behavior of the measuring systems. If the absolute correction values for the front end of the machine measuring system are known, then the front end of the machine measuring system is guided on the nominal curve and the rear end on the already corrected track. At the work station, the straightening operation and lifting operation are performed. The position of the tamping machine in the longitudinal track axis is determined with an odometer.

If the nominal geometry is unknown, then known methods are used to measure the track position with a chord system for the direction and a chord system for the longitudinal height before the work. The cross-actual inclination is recorded with a pendulum. The measurement of the track position via chord systems is subject to a transfer function, i.e. the measured signal deviates from the actual track error in terms of its shape, amplification and phase position. The measured values are similar to the curvatures of the track. The measurement of the elevation of the track by means of a chord measuring system also provides a signal proportional to the curvature (progression of longitudinal height) which is afflicted with a transfer function. Changes in inclination (transition from one inclination to another) cannot be determined from the measurement data, since it is not possible to distinguish between longitudinal height errors (measured on the basis of a chord) of the track position and between inclination transitions, which are also noticeable as longitudinal height differences. In addition, it is not possible to draw any conclusions about the actual inclination from the longitudinal height measurements (the machine is at a certain inclination, but this cannot be derived from the measurements because the entire measuring system is at the inclination and only performs a relative measurement).

For the optimization of the track position according to the known usual methods, the measured arrow heights and longitudinal heights are smoothed to a nominal arrow height curve and a nominal longitudinal height curve. Then the difference between the measured and the smoothed "nominal arrow height image" and the "actual arrow height image" (or the "nominal longitudinal height image" and actual longitudinal height image") is formed. By means of digital filters an approximated inverse transfer function is calculated (see e.g. DE1033797664). This inverse transfer function is now applied to the difference between the measured "actual position images" and the smoothed "nominal position arrow height image" and the "nominal position longitudinal height image". This gives approximate track errors in height and direction. For the longitudinal height, in contrast to the direction, a further processing step results, since only lifting and not lowering is possible. The lifting-lowering curve resulting from the optimization must become positive-definite. For this purpose, the lifting corrections are raised in such a way that no negative values (subsidence) occur. These calculations are difficult and inaccurate because they are based on arrow height and longitudinal height images measured with chords and the transfer functions are complex functions.

Prior art are chord measuring systems and pendulums or inclinometers for measuring longitudinal height, direction and cross slope. Prior art are odometers for determining the position of the measuring system on the track. Prior art are satellite navigation systems (such as GPS, GLONASS, BeiDou or Galileo). Prior art are inertial navigation systems (INS) or inertial navigation systems consisting of a central sensor unit with usually three acceleration and angular rate sensors. By integrating the accelerations and rotation rates measured by the IMU (inertial measurement unit), an INS continuously determines the spatial motion of the vehicle and, from this, the respective geographic position. INS systems operate with data rates of about 100-1000 Hz and high accuracies and low drift (<0.01° to 0.05°/hour). They calibrate automatically during pauses when not in motion. The main advantage of an INS is that it can be operated without reference. The acceleration can be measured by means of vehicle-mounted acceleration sensors ("strapdown"). It is understood that in principle only one IMU can be used, in which case the absolute roll angle must be measured by an independent inclinometer. Advantages of these measuring systems are roll angles that can be measured independently of the centrifugal acceleration, a transfer function of the system of gain=1 that applies over a wide range, i.e. the actual track of the vehicle in space is measured without distortions of the shape, gain or phase position of the track errors. From this three-dimensional track of the vehicle in space and an equidistant measurement via odometer, 3D coordinates are obtained. Projection onto the xy-plane yields the locus of the track and projection onto the yz-plane yields the elevation section. In addition, satellite navigation data (e.g. via GPS) can be recorded. Prior art are also so-called "north"-based INS systems, which provide absolute angular deviations of the roll, yaw and pitch angles related to a system oriented to the north. In this case, the x unit vector points north, the z unit vector points in the direction of gravity, and the y unit vector is then oriented to form an orthonormal system. The absolute angular deviations represent a unit vector which shows the direction of the gauging trolley on which the INS system is located.

A disadvantage of the known methods is that a complex measurement of the actual track position on the basis of a long chord and the absolute position of the actual track position in relation to fixed points on masts must be carried out using suitable measuring equipment. For this purpose, the nominal geometry of the track must be defined and known. In many countries, however, the absolute position of the track is not defined. If the nominal track position is calculated by measuring with an inertial measuring unit from the spatial curve calculated from the measurements, this can be taken as a reference for the next maintenance work with a tamping machine, for example, but the track position cannot be restored with respect to an absolute reference because this is unknown. In addition, during very long measurement runs, the drifts of the IMU have a detrimental effect on the accuracy of the position. Reference points on masts are numerous and require complex and costly maintenance.

SUMMARY OF THE INVENTION

The invention is thus based on the object of further developing a method for measuring a track position, taking into account boundary conditions such as constrained positions, constrained points and maximum permissible track position corrections, in such a way that the disadvantages of the drifts of an inertial measurement system during long measurement runs and the only relative indications of the track position are avoided.

The method according to the invention has the additional advantage that the position of the changes of inclination and the absolute inclinations (nominal changes of inclination) and the track direction (nominal curvature pattern) can be determined exactly and the main points of the curve (such as the start of the transition curve, the start of the curve, the end of the curve, the end of the transition floor, the position of the changes of inclination, etc.) and other points of interest can be specified in absolute GPS coordinates. This has the further advantage that the track can be returned to the defined absolute position during subsequent maintenance work with a tamping machine. According to the invention, there is also the advantage that in the case of several necessary tamping operations (layer-by-layer installation of cleaned or new ballast), a measurement can be made simultaneously during the work and these GPS and inertial measurements can be used to determine the necessary further lifting and alignment correction values. This eliminates a considerable amount of effort and time required for the intermediate measurement that would otherwise be necessary.

The invention solves the set object by determining the position of the GPS antenna with respect to a reference axis of the track with the aid of a compensation scanner and a computing unit, and recording the measured GPS coordinates, converted into Cartesian coordinates, with the computing unit as a spatial curve from which the location image, from which a nominal curvature image ($GPS_{xysoll}$) is calculated, and the longitudinal image, from which a nominal longitudinal inclination image is calculated, are formed, and that an inertial system is set up on the gauging trolley, with which inertial system a correction spatial curve of the same section is generated, is recorded using the computing unit and is used as correction value for the GPS coordinates converted into Cartesian coordinates. Since the GPS antenna can only measure its own position with the RTK receiver, but the exact GPS coordinates of the track being measured are required, the offset of the GPS antenna from a reference axis laid through a rail of the track is determined. This offset, which can change in the course of the survey due to vibrations, acceleration, migration of parts of the track measurement vehicle, etc., is determined by means of the compensation scanner.

From the GPS coordinates and this offset, the computing unit now determines the actual GPS coordinates of the track to be measured and converts them into a spatial curve specified in Cartesian coordinates. This spatial curve represents the absolute actual course of the measured track. By setting the z-component to zero as the height component, a spatial image is created from which a nominal curvature image is determined. This nominal curvature image represents the desired course of the track projected onto the xy-plane. Similarly, by setting the x-, or the y-component to zero, a longitudinal image is created, from which a nominal inclination image is determined, representing the desired changes in elevation of the track. In order to determine a smoothed nominal curvature or inclination image, a compensation polynomial is now applied through measured data points. In this way, drift-independent data about the course of the track can be obtained, the accuracy of which is limited only by the RTK system used. However, since track tamping machines, for example, require a higher position accuracy than can be determined by means of RTK-GPS measurement, the rail of the track measured by means of RTK-GPS is additionally measured with the more accurate inertial system. This inertial system, which can, however, only measure a relative position in a local coordinate system, uses the measured values to form another spatial curve, the correction spatial curve, which also represents the actual course of the measured track. The computing unit can then relate the more accurate but relative measured coordinates of the inertial system by means of the absolute but less accurate coordinates from the RTK-GPS measurements and assign a measured coordinate point of the inertial system to each measured RTK-GPS coordinate point, whereby the drift of the inertial system can be determined and calculated out.

In addition, the arc length, i.e. the length of the measured track section, can be recorded by means of an odometer. As is well known to the person skilled in the art, the reference axis is placed through the non-superelevated rail for determining the z-coordinates and through the superelevated rail for determining the x- and y-coordinates.

The specific advantages of the inertial system and RTK-GPS coordinate measurement can be exploited particularly well if the correction value is determined from the difference between the actual values and the nominal values of the location and longitudinal image, wherein the actual values are formed from the correction spatial curve determined by the inertial system and the nominal values are formed from the nominal curvature image of the GPS coordinates. Since the inertial system, in contrast to the RTK-GPS coordinate measurement, can detect position changes very accurately, but cannot determine an absolute position in space, the difference between the nominal values of the location image and the longitudinal image formed from the GPS coordinates is formed with the actual values of the correction spatial curve detected by the inertial system in order to arrive at the correction value.

In order to ensure a continuous measurement even in the absence of GPS data, the correction spatial curve created by the inertial system can be used as a spatial curve in the absence of GPS data. According to the invention, the correction spatial curve only serves to correct the spatial curve created by means of the GPS data. However, if the reception of the GPS signal is impeded, for example by passing through a tunnel, or fails completely, the correction spatial curve of the inertial system, which records the position independently of external signals, can serve as the spatial curve until reliable GPS reception is restored.

In order to measure the offset between the reference axis and the GPS antenna in a technically simple and reliable way, a laser scanner can be used as a compensation scanner to determine the relative position of the GPS antenna to the rail. For this purpose, the rest position, i.e. the position of the GPS antenna relative to the reference axis at standstill, is first determined. The laser scanner emits a laser signal and detects its position and is connected to the GPS antenna in such a way that a deflection from this rest position results in a change in position of the laser signal generated by the laser scanner, from which the distance, the deflection and subsequently the offset can be measured instantaneously with high accuracy.

Particularly advantageous design conditions result when the laser scanner determines the inclination of a machine frame as well as its distance from the track gauging trolley in order to determine the relative position of the GPS antenna to the rail. The GPS antenna is arranged on the machine frame. The laser scanner can be arranged on the machine frame and emits its light beam onto a grid, for example a ruler. It is understood that the arrangement of the laser scanner and the grid can be interchanged. The position of the laser signal on the grid is recorded as a function of the relative movement of the track gauging trolley to the machine frame, and from this the height of the machine frame above the track gauging trolley, the lateral displacement of the gauging trolley relative to the machine frame and the inclination of the gauging trolley to the machine frame are calculated. This data can now be used to determine the change in position of the antenna relative to the rest position.

A GPS antenna is set up above a track gauging trolley that is guided on the track. Sensors measure the lateral excursion, the cross slope and the height distance between the GPS antenna and a reference axis laid through the track. From these measured values and the height of the GPS antenna above the reference axis, the position of the GPS antenna relative to the reference axis in the track can thus be calculated precisely. GPS coordinates of the antenna can thus be converted to track coordinates. The GPS antenna is connected to an RTK-GPS multi-system receiver. The RTK-GPS multi-system receiver is connected to an RTK correction data service, and the measured coordinates are transferred to a computing unit. According to the invention, the gauging trolley can be supplemented as a 2-axis gauging trolley with five degrees of freedom and inertial measuring unit with odometer. After completion of the measurement run, the track of the GPS coordinates is converted into Cartesian coordinates and the track geometry can be determined under boundary conditions.

BRIEF DESCRIPTION OF THE INVENTION

Figure 5:
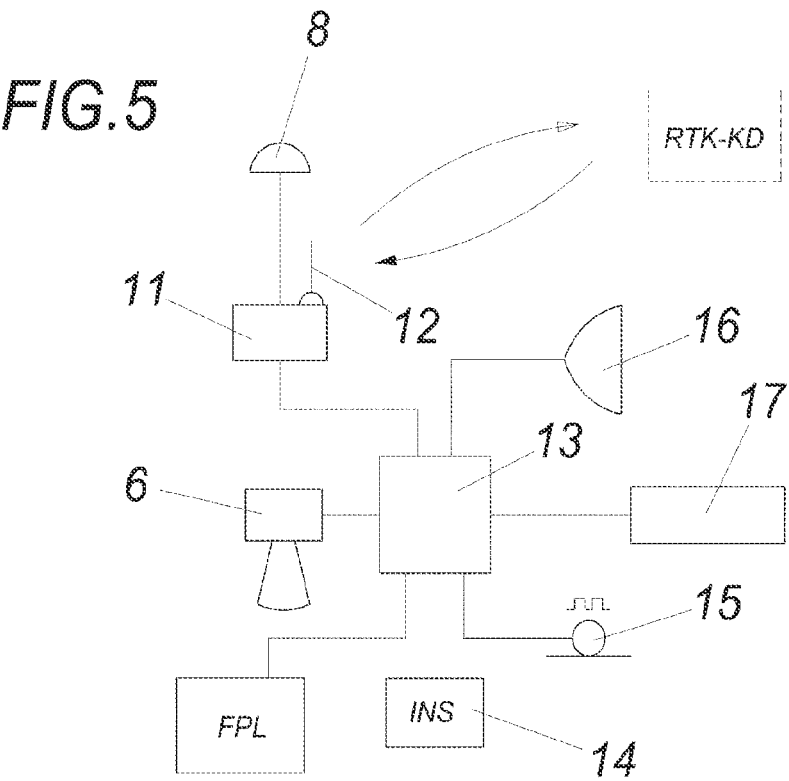
Figure 3:
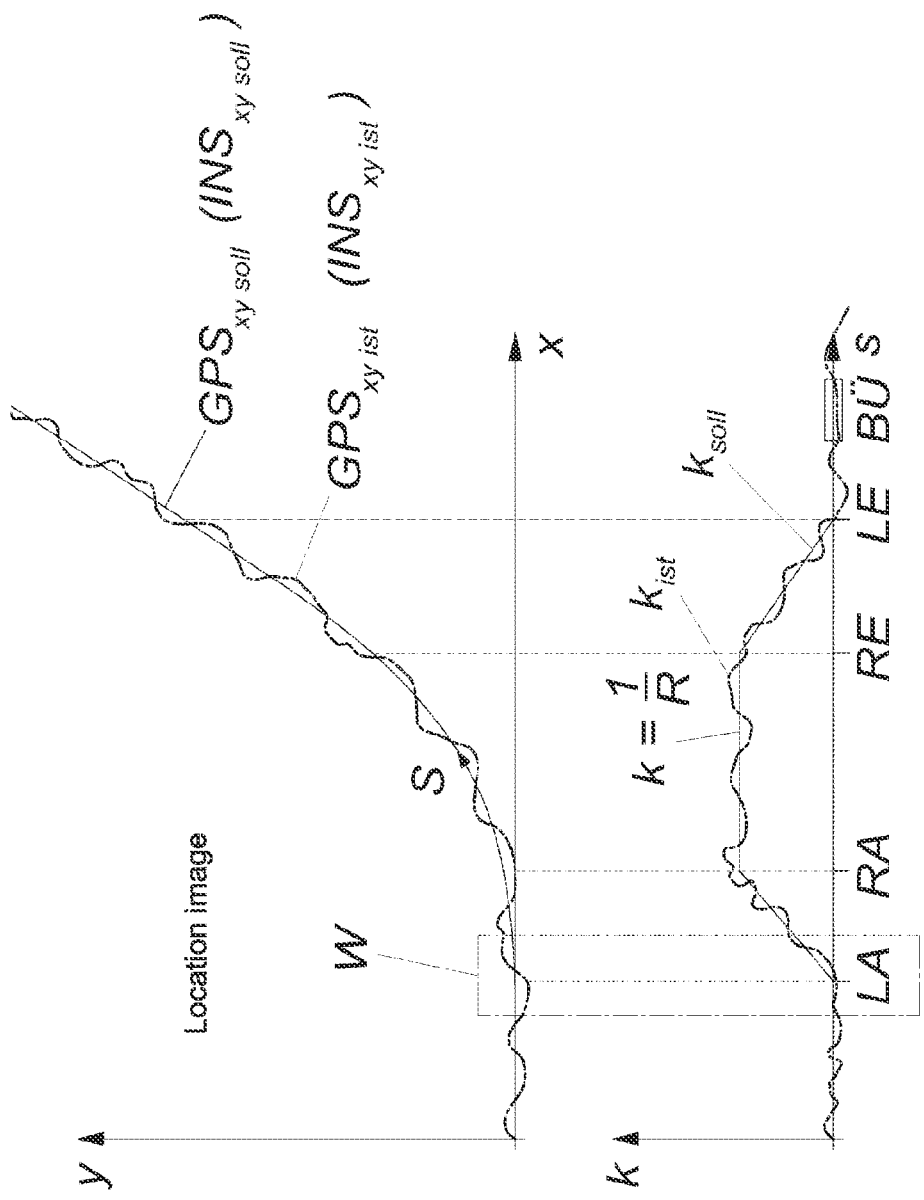
Figure 4:
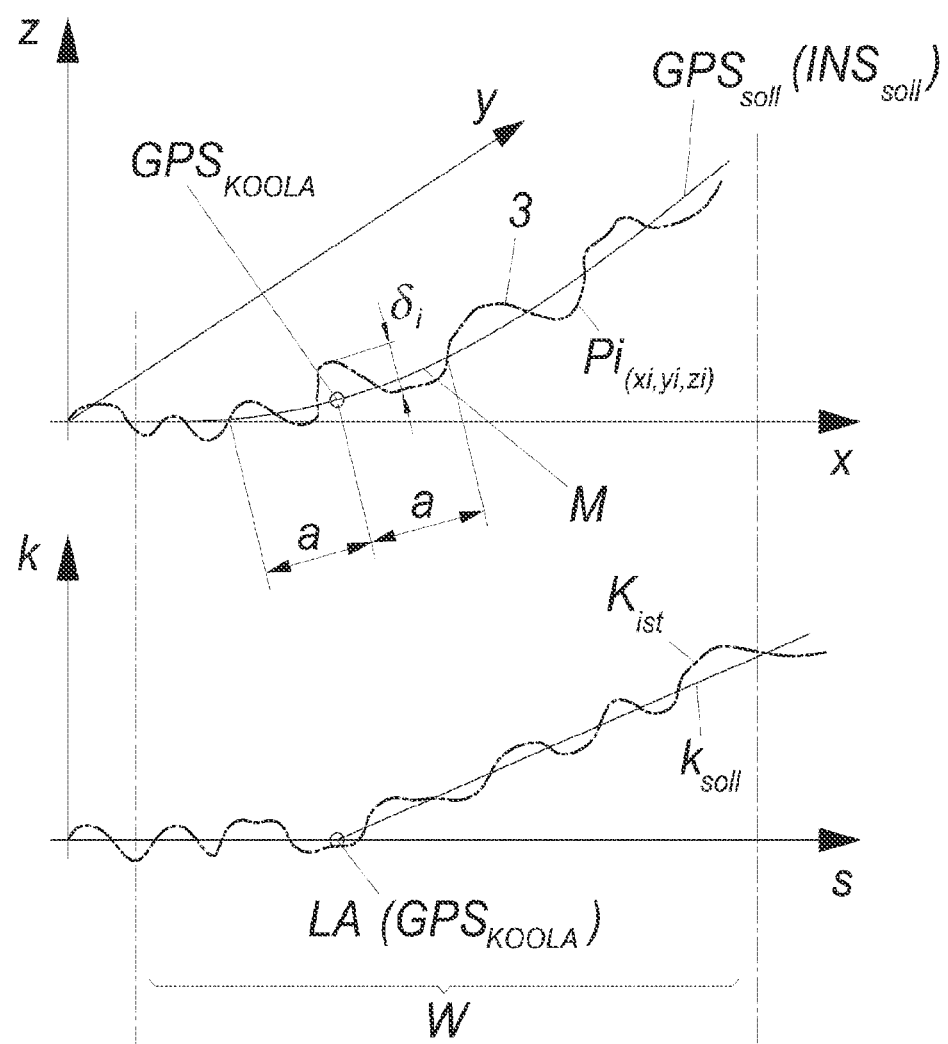

In the drawing, the subject matter of the invention is shown schematically, for example, wherein:

FIG. 1 shows a diagram of 3D track coordinates—determination of the location image and the longitudinal image, FIG. 2 schematically shows a track gauging trolley with GPS antenna on a machine frame and compensation scanner, FIG. 3 schematically shows the projection of the spatial curve onto the xy-coordinate plane and the actual and nominal curvature image of the optimized track position with curved main points, FIG. 4 shows the GPS spatial curve or INS spatial curve and an arc principal point with compensation polynomial M for determining the GPS coordinates, FIG. 5 shows a diagram of the receiver and control electronics, and FIG. 6 schematically shows the projection of the GPS spatial curve or INS spatial curve onto the yz-coordinate plane (longitudinal image) and the actual and nominal inclinations of the optimized track position.

DETAILED DESCRIPTION OF THE PREFERRED EMBODIMENTS

FIG. 1 shows schematically the spatial curve 3 measured and recorded with RTK-GPS with coordinate triples $P_i(x_i, y_i, z_i)$. By setting z to zero, the projection of this spatial curve 3 onto the xy-plane, the location image 1, is obtained. Similarly, by setting x to zero, the projection of the spatial curve 3 onto the yz-plane, the so-called longitudinal image 2, is obtained. For each of the measured and recorded coordinate triples $P_i$, the current arc length $s_i$ (track km) is calculated from the GPS coordinates and stored as a parameter.

According to the invention, FIG. 2 shows a track gauging trolley 7 having a wheel 10 pressed against the left rail 4. A GPS antenna 8 is mounted above it on the machine frame 9 at the height $H_A$. On the underside of the machine frame 9 above the track gauging trolley 7 there is a laser scanner as a compensation scanner 6 with a scanning area β. The laser scanner scans over a ruler as a grid with center marking 5 which is set up on the track gauging trolley. From the scan data, the height H of the machine frame 9 above the track gauging trolley 7, the lateral displacement D of the gauging trolley 7 relative to the machine frame (e.g. in an arc) 9 and the differential angle α of the inclination of the gauging trolley to the machine frame can be calculated. With this data, the position $H_{GPS}$, $D_{GPS}$ of the antenna 8 on the reference rail 10 can now be calculated. This allows the spatial track of the track to be specified in GPS coordinates or converted to Cartesian coordinates.

FIG. 3 shows schematically in the upper diagram the projection of the GPS spatial curve $GPS_{xyist}$ (or the INS spatial curve $INS_{xyist}$) onto the xy-plane (the local image) 1 (dashed line). The solid line shows the calculated nominal geometry curve $GPS_{xysoll}$ (or $INS_{xysoll}$). S denotes the arc length calculated from the GPS data of the GPS spatial curve 3 (or measured with odometer) and co-stored.

FIG. 4 shows the GPS spatial curve 3 (or INS spatial curve) in the upper diagram. This can be used, for example, to restore the absolute position defined via the optimization during future maintenance of the track position. For this purpose, for example, a compensation polynomial M (e.g. $2^{nd}$ order with a=5-10 m length) is calculated over a range ±a of the spatial curve 3. The calculated coordinate at location LA is then specified as the absolute GPS coordinate $GPS_{KOOLA}$. The distance of this nominal GPS coordinate to the actual GPS coordinate at LA is calculated as the deviation $δ_i$. In the lower diagram, the nominal curvature pattern $k_{soll}$ and the actual curvature pattern $k_{ist}$ are shown in the region of the transition arc start LA. The point LA is then known as $GPS_{KOOLA}$ in absolute coordinates.

FIG. 5 schematically shows the RTK-GPS receiver 11 with GPS antenna 8 and a radio antenna 12 and the radio connection with the RTK correction service RTK-KD. The RTK-GPS receiver is connected to a computing unit 13, to which a screen 16, a keyboard 17, a compensation scanner 6, an odometer 15, an inertial measurement unit INS and a control and regulation unit FPL are connected. The computing unit 13 calculates INS nominal curvature and nominal inclination images as well as lift and straightening correction values from the GPS data 11 and the INS data, respectively, and transmits these to the control and regulation unit FPL of a maintenance machine.

FIG. 6 shows schematically in the upper diagram the projection of the GPS spatial curve $GPS_{yzist}$ (or the $INS_{yzist}$) onto the yz-plane (the longitudinal image) 2 as a dashed line. The solid line shows the calculated nominal inclination image $GPS_{yzsoll}$ (or $INS_{yzsoll}$). S denotes the arc length calculated from the GPS data of the GPS spatial curve 3 (or the odometer in the case of an INS measurement) and co-stored. The lower diagram shows the actual inclination $N_{ist}$ from the longitudinal projection $GPS_{yzist}$ (or $INS_{yzist}$) (dashed line) and $Ni_{soll}$ the nominal curvatures from the optimization calculation (solid line).

The invention claimed is:

1. A method for gauging a track position using a track gauging trolley supported for movement on a track, said method comprising:
   carrying out a gauging run with the track gauging trolley, a GPS antenna, and an RTK-GPS receiver that communicates with an RTK correction data service, wherein at least one wheel of the track gauging trolley is pressed against a rail; including
   determining a position of the GPS antenna with respect to a reference axis of the track using a compensation scanner and a computing unit, and
   converting measured GPS coordinates into Cartesian coordinates $(P_i(x_i, y_i, z_i))$ and storing the converted GPS coordinates with the computing unit so as to form a spatial curve of a section;
   forming from the spatial curve a location image and a longitudinal image;
   calculating a nominal curvature image ($GPS_{xysoll}$) from the location image; and
   calculating a nominal longitudinal inclination image ($N_{soll}$) from the longitudinal image; and
   wherein an inertial system is set up on the track gauging trolley, and the method further comprises
   producing with said inertial system a correction spatial curve of the section;
   recording the correction spatial curve using the computing unit; and
   using the correction spatial curve to produce a correction value for the converted GPS coordinates.

2. The method according to claim 1, wherein the correction value is determined from a difference of actual values and nominal values from the location image and the longitudinal image, wherein the actual values are derived from the correction spatial curve determined by the inertial system and the nominal values are derived from the nominal curvature image ($GPS_{xysoll}$).

3. The method according to claim 1, wherein the correction spatial curve generated by the inertial system is used as the spatial curve when the spatial curve has data of the GPS coordinates missing therefrom.

4. The method according to claim 1, wherein the compensation scanner comprises a laser scanner that determines a relative position of the GPS antenna to the rail.

5. The method according to claim 4, wherein, the laser determines the relative position of the GPS antenna to the rail determining an inclination of a machine frame and a distance thereof from the track gauging trolley.

6. The method according to claim 2, wherein the correction spatial curve generated by the inertial system is used as the spatial curve when the spatial curve has data of the GPS coordinates missing therefrom.

7. The method according to claim 6, wherein the compensation scanner comprises a laser scanner that determines a relative position of the GPS antenna to the rail.

8. The method according to claim 2, wherein the compensation scanner comprises a laser scanner that determines a relative position of the GPS antenna to the rail.

9. The method according to claim 3, wherein the compensation scanner comprises a laser scanner that determines a relative position of the GPS antenna to the rail.

10. The method according to claim 7, wherein, the laser determines the relative position of the GPS antenna to the rail by determining an inclination of a machine frame and a distance thereof from the track gauging trolley.

11. The method according to claim 8, wherein, the laser determines the relative position of the GPS antenna to the rail by determining an inclination of a machine frame and a distance thereof from the track gauging trolley.

12. The method according to claim 9, wherein, the laser determines the relative position of the GPS antenna to the rail by determining an inclination of a machine frame and a distance thereof from the track gauging trolley.

* * * * *